May 8, 1951 E. MITTELMANN 2,551,757

HIGH-FREQUENCY HEATING

Filed Aug. 10, 1945

INVENTOR.

Eugene Mittelmann

BY

Moore, Olson & Trexler attys.

Patented May 8, 1951

2,551,757

UNITED STATES PATENT OFFICE 2,551,757

HIGH-FREQUENCY HEATING

Eugene Mittelmann, Chicago, Ill.

Application August 10, 1945, Serial No. 610,088

4 Claims. (Cl. 250—36)

This invention relates to a method and apparatus for heating by means of high frequency electric current.

The object of the invention is to secure optimum transfer of energy from a high frequency generator to the material or object to be heated. My invention is concerned with the method and means for adjusting a variable coupling between an oscillator generator and a reactive heater to match initially the heater load to the oscillator and to govern the maintenance of the matched condition by the direct current component of the plate current drawn by the oscillator.

Another object of the invention is to provide high frequency heating apparatus and a method of operating that apparatus by means of which the apparatus may be pre-adjusted before the object or material is inserted in the reactive heater to establish a matched condition when the material or object is inserted in the heater and then to maintain automatically the matched condition during the entire heating operation. This is accomplished by a control which is calibrated at the factory, and operationally adjusted in terms of power level to cause automatic adjustment of a variable coupling between the oscillator and the reactive heater to initially match the heater to the generator when the material or object is inserted in the heater and to maintain the matched condition during the heating operation.

A still further object of the invention is to couple a high frequency oscillator to a reactive heater so that a wide change in the coupling ratio may be effected without danger of flash over. This is accomplished with the provision of one or more pairs of metal plates adjustable relative to each other so that the spacing between the plates increases with increasing voltage across the plates.

Figure 1:
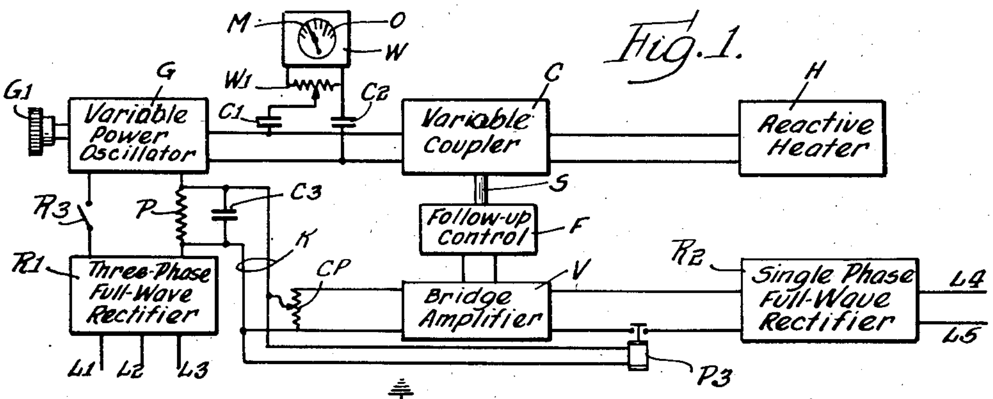
Figure 2:
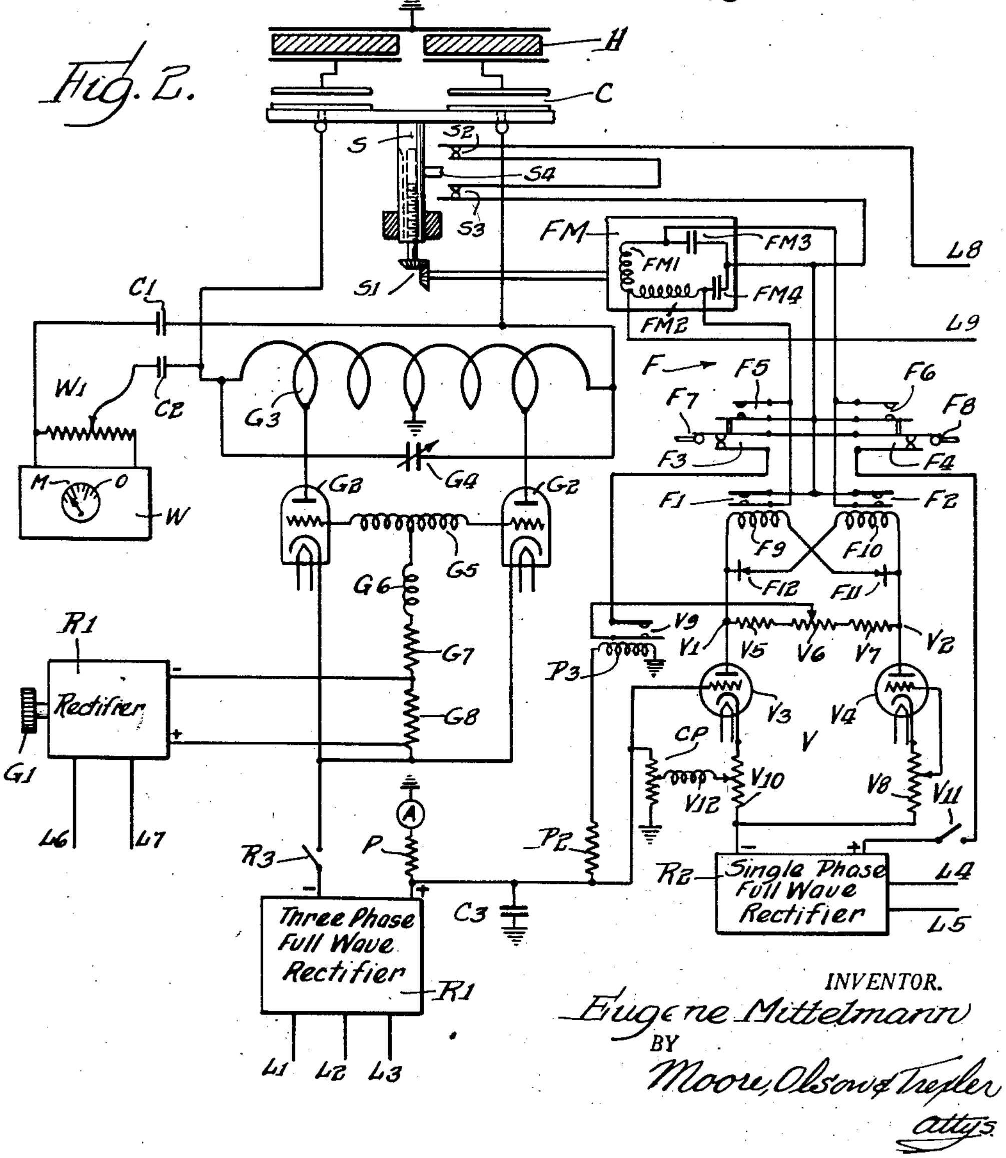

Other objects and advantages will become apparent by reference to the following description in conjunction with the accompanying drawing wherein Figure 1 is a block diagram of a heating apparatus including an electronic oscillation generator and a reactive heater and provided with means embodying my invention for initially matching the load impedance to the generator impedance and for maintaining the matched condition during heating; and Figure 2 is a schematic diagram of the apparatus of Figure 1 illustrating certain specific circuit details.

The block diagram of Figure 1 shows a variable power oscillator G provided with a power level adjustor G1 and connected by suitable power conductors to a variable coupler C which in turn is connected to a reactive heater H. A galvanometer W of a high frequency wattmeter is connected across a wattmeter sensitivity control resistor or potentiometer W1 which is in turn coupled through capacitors C1 and C2 to the transmission conductors interconnecting the variable power oscillator G and the variable coupler C. The variable power oscillator G is supplied with power from a three-phase full wave rectifier R1 energized from polyphase alternating current lines L1, L2 and L3.

A switch R3 is interposed in one of the conductors between the variable power oscillator G and the three-phase full wave rectifier R1. In the other conductor between the oscillator G and the rectifier R1 there is connected a resistor P which is by-passed by a capacitor C3 and is connected by a cable K to a calibrated potentiometer CP. The calibrated potentiometer CP is connected to control a voltage responsive bridge amplifier V which receives its power from a single-phase full wave rectifier R2 energized from single phase alternating current lines L4 and L5 which may be supplied from a pair of the three-phase lines. The bridge amplifier V controls a follow-up control F which is mechanically connected by a mechanism S to the variable coupler C.

The variable coupler C which includes spaced capacitor plates is adjusted through the mechanism S connected to the motor and the follow-up control F. The follow-up control F is responsive to unbalance of the bridge amplifier V which is so connected as to be governed by the oscillator anode or plate current, as reflected by the voltage drop appearing across the resistor P.

I have found that if the oscillator tubes are operated at each power level setting in such a manner that the plate current is driven into the saturation region of their plate voltage, plate current curves, then for matched conditions the plate current is such a function of the power level setting of the oscillator and of the equivalent load resistance across the oscillator tank circuit that it may be used to govern the setting of the variable coupler in order to establish and maintain an equality between that resistance and the equivalent internal dynamic resistance of the oscillator, i. e., the optimum load resistance value of the oscillator at each power level setting.

Hence the potentiometer CP, bridge amplifier V, follow-up control F and variable coupler C are so calibrated at the factory as to establish initially a given plate current for each power level setting of the oscillator and to maintain that given value throughout the heating operation. The potentiometer CP is calibrated for different power level settings of the oscillator G, its dial being preferably calibrated in the same terms as the power level adjustor G1. The resistor P is adjusted or calibrated at the factory to obtain the desired degree of sensitivity in the response of the bridge amplifier V to changes in the minimum power level value by the plate current caused by a predetermined minimum change in the equivalent load resistance across the tank circuit.

Upon closing the switch R3, the oscillator G becomes energized and upon supplying a minimum power to the load, it automatically connects the bridge amplifier V to its supply rectifier by means of a responsive relay P3. The bridge amplifier V thereupon energizes the follow-up control F and the variable coupler C is automatically adjusted to match the load impedance to the generator impedance.

As heating progresses in the reactive heater, the load impedance changes, and hence the plate current through the resistor P also changes. This change in the plate current through resistor P produces a change in the voltage impressed upon the calibrated potentiometer CP and unbalances the bridge amplifier V. This causes the follow-up control F to be driven in the proper direction to cause a compensating change in the coupling when the plate current returns to its original value, the bridge amplifier becomes rebalanced, the follow-up control is deenergized and the load impedance is thus rematched to the generator impedance.

The bridge amplifier V is energized from the single-phase full wave rectifier R2 in such a manner as to be independent of slight voltage variations of the source of power which supplies the variable power oscillator G. The three-phase full wave rectifier R1 is not of the voltage stabilized type, but the oscillator G is so designed that the plate current is driven into the saturation region of its plate voltage, plate current curve so that the plate or anode current through the resistor P is substantially constant for normally encountered changes in the value of the output voltage of the rectifier. Greater than normal changes in the voltage of the rectifier cause a change in the plate currents through the resistor P. This change will be indicated by the wattmeter W.

The wattmeter W is energized from the resistor W1 which also is calibrated in terms related to certain power values so that when properly adjusted the wattmeter will read directly the rate of power absorption in the material in the heater. If for any reason the reading of the wattmeter W does not agree with the setting of the calibrated potentiometer CP and that of the power level control G1, then adjustment of the potentiometer CP and control G1 may be made to secure the correct power value.

The power oscillator G is of the tuned plate, tuned grid type having the midpoint of its tank circuit grounded. The oscillator employs a pair of vacuum tubes G2 having their anodes connected adjacent opposite ends of the tank circuit coil G3 which is tuned by capacitor G4.

The grids of the vacuum tubes G2 are interconnected by an inductor G5 having a midpoint connected to another inductor or choke coil G6. The inductor G6 is connected to series resistors G7 and G8 which are connected to the cathodes of the vacuum tubes. The cathodes of the vacuum tubes are connected through the switch R3 to the negative side of the output of the three-phase full wave rectifier R1. The positive side of the output of the rectifier R1 is connected to the anode current resistor P which in turn may be connected to a suitable ammeter and to ground.

The grid-to-cathode resistor G8 is adapted to be supplied with a biasing current from the power level control G1 which comprises an adjustable voltage or current rectifier unit which may be energized from the power lines L6 and L7. The power level control G1 may be calibrated to indicate various load values or conditions in accordance with which the variable power oscillator G is to operate.

The resistor P connected between the positive terminal of the rectifier R1 and ground is provided with a radio frequency by-pass capacitor C3. From the juncture between the capacitor and the resistor, there is connected a resistor P2 which is arranged in series with the energizing coil of a relay P3 having a pair of normally open contacts V9.

The contacts V9 are connected in a series circuit extending from the positive side of the rectifier R2 through cut out switch V11, a pair of contacts F4 of a manually operable switch F8, a pair of contacts F3 of a manually operable switch F7, through the relay contacts V9 to the adjustable arm on a resistor V6 connected between resistors V5 and V7. The resistors V5 and V7 together with the resistor V6 are connected between the anodes of a pair of vacuum tubes V3 and V4 forming a part of the bridge amplifier V. The vacuum tube V4 has a cathode resistor V8 provided with an adjustable contact which is connected to the grid of the tube. The cathode of the vacuum tube V3 is connected to a resistor V10.

The vacuum tubes V3 and V4 are arranged to operate relays F9 and F10. The relay F9 is connected to the anode of the vacuum tube V3 and to a unilaterally conductive device or rectifier F11, to the anode of the vacuum tube V4 and to the resistor V7. The relay F10 is connected between the anode of the vacuum tube V4 and another rectifier F12 which is connected to the juncture between the resistor V5 and the anode of the vacuum tube V3.

The relay F9 is provided with a pair of normally open contacts F1 which are connected in a series circuit extending from the line conductor L8 through two limit switches S2 and S3 to a reversible control motor FM which is arranged to drive the mechanism S through the gearing S1. The motor FM is a reversible alternating current motor, as, for example, a drag cup type having two inductive windings FM1 and FM2 associated with capacitors FM3 and FM4.

The juncture between the two inductive windings FM1 and FM2 is connected to the line conductor L9. The juncture between the two capacitors FM3 and FM4 is connected through the limit switches S3 and S2 to the line conductor L8. The juncture between the capacitor FM4 and the inductor FM2 is connected to one of the contacts of the switch contact pair F1 and also to one contact of the switch contact pair F5. The pair of contacts F5 which are normally in open circuit position are a part of the manually operable switch F7. The juncture between the inductor FM1 and the capacitor FM3 is connected to one contact of the pair of contacts F2 forming a part of the relay F10 and also to one of the pair of contacts F6 forming a part of the manually operable switch F8.

For automatic operation of the apparatus shown in Figure 2 the material to be heated is placed in the reactive heater H. Dependent upon the nature and mass of the material and the rate of heat generation desired a particular power level setting is required. The cathode resistor V10 of the vacuum tube V3 is provided with an adjustable contact which is connected through a suitable inductor choke coil V12 to the adjustable contact on the calibrated potentiometer CP. The grid of the vacuum tube V3 is connected to the common juncture of the calibrated resistor CP and the anode current resistor P. The calibrated potentiometer CP is connected to ground and is so adjusted that a predetermined voltage therefrom may be applied to the grid-to-cathode circuit of the vacuum tube V3 in accordance with the required power level setting of the variable power adjustor G1. The power level control G1 is thereupon adjusted to a graduation corresponding to the desired power level of operation for which the calibrated potentiometer CP has been adjusted. Thereupon the switch R3 is closed to supply anode potential to the variable power oscillator G.

When oscillation starts, current flows through the resistor P2 and the relay coil P3 to close the relay contacts V9 thereby to complete a circuit between the vacuum tubes V3 and V4 and the positive terminal of the full wave rectifier R2. Thus the bridge circuit V is placed in operation and actuates the follow-up motor FM which, through the gearing S1, moves the reciprocable sleeve S between the limits provided for by the location of the limit switches S2 and S3 arranged to be actuated by the stop S4. The position of these switches is so selected that the safe limits of movement of the capacitor plates C are not exceeded.

The bridge amplifier V and the follow-up control F thereupon automatically adjust the impedance relation between the load and the generator so that they are matched. The voltage divider W1 and the wattmeter W are so calibrated at the factory for different known load values matched to the generator that with the wiper of the divider W1 being set in a given position, the wattmeter thereafter indicates the actual power absorption during the heating operation.

As the heating process continues, the impedance relation between the load and the power oscillator G will change. This change is reflected in a change of the anode or plate current supplied to the vacuum tubes G2 so that the voltage drop across the resistor P changes. This voltage drop will produce a change in the voltage appearing between the cathode and the grid of the vacuum tube V3 so as to unbalance the bridge amplifier thereby to bring about actuation of the follow-up motor FM which will adjust the coupling capacitor C until a matched relation is again established whereupon the motor FM becomes de-energized.

This rematching action takes place because of the operation of the bridge amplifier V which comprises the vacuum tubes V3 and V4 and the resistors V5, V6, and V7. At any instant the voltage between the grid and the cathode of the vacuum tube V3 is equal to the sum of the voltage drop across the high potential portion of the calibrated potentiometer CP and the high potential portion of the cathode resistor V10.

The plate resistor P was adjusted at the factory to reflect, upon a predetermined change in the plate current, sufficient voltage to bring about operation of the bridge amplifier V. The potentiometer CP is calibrated in terms of power units so that it may be adjusted according to the desired power level of operation of the oscillator G. When both the vacuum tubes V3 are in a balanced condition, the balance points V1 and V2 are at equal potentials so that there is no voltage difference across the relays F9 and F10 and hence neither of these relays may operate.

Dependent upon the sign of the voltage difference between the balance points V1 and V2, the proper relay coils F9 or F10 will be operated to bring about the proper direction of rotation of the follow-up motor FM.

If desired the apparatus shown in Figure 2 may be operated manually or semi-automatically. For this purpose the manually operable switches V11, F7, and F8 are provided.

Opening of the switch V11 permits full manual operation by the use of switches F7, and F8. Actuation of switch V11 opens the power supply connections to the rectifier R2 thereby rendering the bridge amplifier V inoperative. The resistor W1 of the wattmeter W is set to full sensitivity, and the heater being disconnected or empty, the power level control G1 is adjusted to bring the needle of the wattmeter to the full scale mark O. Thereupon the heater is connected, or material placed therein, and the switch F7 or F8 operated to change the coupling C until the needle of the wattmeter is brought to the dial mark M so that the load is now matched to the generator. Thereupon the sensitivity potentiometer W1 is adjusted to a point corresponding to dial mark M. The power level is then raised by actuation of the control G1 to the desired value whereupon the wattmeter needle will move above the mark M and read the true value of the power absorption.

Thereafter the switches F7 and F8 are operated manually to keep the needle of the wattmeter on the value mark to which it was raised on the setting of the power level by the control G1. If it is desired to indicate the maintenance of a matched condition without the indication of power absorption, the sensitivity resistor W1 may be readjusted after raising the power level to bring the wattmeter needle back to the mark M.

For semi-automatic operation, the switch V11 is left closed and the switches F7 and F8 operated manually to match initially the load to the generator. Thereafter the power level is raised by control G1, the reading of the wattmeter noted and potentiometer CP adjusted to a corresponding position. Thereafter the bridge amplifier automatically maintains the matched relation as the load varies.

The semi-automatic operation is of particular advantage where work pieces of different sizes are to be treated in succession. For example, the apparatus may have a setting for a work piece where the capacitor C is in a position to provide a large amount of capacitance. If thereupon a different sized work piece is introduced into the heater H, the coupling may be too great so as to produce an overload which may result in tripping the circuit breakers. The operator of an apparatus of this type is aware of this possibility and hence when different sized work pieces are to be introduced, it is only necessary to actuate either the switch F7 or the switch F8 to change the setting of the capacitor C to decrease the coupling and the amount of energy which will be supplied to the load H. By opening the capacitor C, the initial load applied to the generator G will not be sufficient to produce an overload, and thereafter the automatic follow-up control may be relied upon to obtain the proper matching between the load and the generator.

The arrangement heretofore described has a bridge amplifier V which is not subject to voltage variations caused by the change of power taken by the rectifier R1. The use of a power calibrated resistor CP for one of the tubes of the bridge amplifier eliminates any interconnection between the follow-up control and the high voltage and power level control connections of the variable power oscillator G.

While certain specific structural details have been disclosed and described herein for the purpose of illustrating my invention, it will be apparent that other modifications and changes may be made without departing from the spirit and scope of the appended claims.

This invention is hereby claimed as follows:

1. In radio frequency apparatus comprising a thermionic tube oscillator coupled to a variable reactive load circuit, means for controlling the ratio of coupling of said load circuit to said oscillator, adjustable means for presetting the power level of operation of said oscillator, electric motor means for actuating said coupling control means, a motor control circuit connected to the anode circuit of said oscillator tube for rendering said motor means operable to actuate said coupling control in response to the anode current of said oscillator tube, said control circuit including adjustable means for predetermining the value of the anode current to which said control circuit responds and calibrated for adjustment according to the adjustment of said power level presetting means whereby said coupling control means is actuated by the motor means to establish and maintain a matched condition between the impedance of the reactive load circuit and the optimum oscillator load impedance value at each setting of the adjustable power level presetting means.

2. In radio frequency apparatus comprising an oscillator having a space discharge tube, means for supplying direct current power to the plate circuit of said tube and a radio frequency power output circuit, a variable impedance load coupled to the radio frequency output circuit of the oscillator, a variable impedance device for changing the ratio of coupling of the load to the oscillator, control means for actuating said device and calibrated to maintain by adjustment of said device a matched condition between the variable impedance load and the optimum oscillator load impedance value, said control means comprising a reversible electric motor mechanically connected to said device, and a motor control including space discharge tubes having their input circuits connected to the anode circuit of said oscillator and their outputs connected to control said motor for rendering said motor operative for operation in one direction on an increase in the anode current of the oscillator tube above a predetermined value and for rendering the motor operative for operation in the opposite direction on a decrease in the anode current of said oscillator tube below said predetermined value.

3. In radio frequency apparatus comprising an oscillator circuit including a space discharge tube, a variable impedance load circuit coupled to the oscillator circuit, a variable impedance coupling control device in one of said circuits, a reversible motor for adjusting said device, a voltage responsive follow-up control circuit normally arranged to control the operation of said motor, adjustably presettable means for predetermining the power level of operation of said oscillator, an adjustable impedance in the plate circuit of said oscillator tube to supply control voltage for said follow-up control circuit to actuate the motor in one direction through the control circuit on an increase of plate current of said oscillator above a predetermined value and to actuate the motor through the control in the opposite direction on a decrease in said plate current below said predetermined value, means for adjusting said voltage supply impedance in accordance with the presetting of said power level adjusting means thereby to preset the predetermined value of plate current to which said follow-up control responds at each power level setting of the oscillator.

4. In radio frequency apparatus comprising an oscillator having a frequency determining resonant circuit including a variable impedance load having reactive and resistant components, said resonant circuit including a tank coil and a variable impedance coupling control device in said circuit between said tank coil and said load, said oscillator including means for setting said oscillator for operation at different selected power levels, said oscillator having a plate supply circuit including an adjustable impedance to supply a control voltage, a balanced bridge amplifier having its input connected to said adjustable impedance for response to said supply control voltage and having an output circuit, a reversible electric motor controlled by said output circuit mechanically connected to said variable impedance coupling control device, the input circuit of said balanced bridge amplifier having an adjustable impedance to cause said amplifier to respond to a given value of plate current through said adjustable impedance for each different power level setting of said oscillator whereby said coupling control device is adjusted to maintain the resistive component of the load substantially constant across the tank coil for each different power level setting of the oscillator.

EUGENE MITTELMANN.

REFERENCES CITED

The following references are of record in the file of this patent:

UNITED STATES PATENTS

| Number | Name | Date |
|---|---|---|
| 2,147,689 | Chaffee | Feb. 21, 1939 |
| 2,251,277 | Hart et al. | Aug. 5, 1941 |
| 2,252,941 | Mittelmann | Aug. 19, 1941 |
| 2,324,525 | Mittelmann | July 20, 1943 |
| 2,333,412 | Crandell | Nov. 2, 1943 |
| 2,358,454 | Goldstine | Sept. 19, 1944 |
| 2,376,667 | Cunningham et al. | May 22, 1945 |
| 2,396,004 | Gilbert | Mar. 5, 1946 |
| 2,415,799 | Reifel et al. | Feb. 11, 1947 |
| 2,416,172 | Gregory et al. | Feb. 18, 1947 |
| 2,448,541 | Maxson | Sept. 7, 1948 |
| 2,467,285 | Young et al. | Apr. 12, 1949 |
| 2,470,443 | Mittelmann | May 17, 1949 |
| 2,473,188 | Albin | June 14, 1949 |

OTHER REFERENCES

Wireless World, Sept. 1944, pages 274–277.

Mittelmann, "Load Rematching in Electronic Heating," Electronics, February 1945, pages 110–115.